(12) United States Patent
Chee et al.

(10) Patent No.: US 11,922,689 B2
(45) Date of Patent: Mar. 5, 2024

(54) DEVICE AND METHOD FOR AUGMENTING IMAGES OF AN INCIDENT SCENE WITH OBJECT DESCRIPTION

(71) Applicant: MOTOROLA SOLUTIONS, INC., Chicago, IL (US)

(72) Inventors: Chong Hin Chee, Gelugor (MY); Wei Lun Chan, Simpang Ampat (MY); Vincent Van Der Walt, Dalkeith (GB); Stuart James Boutell, Edinburgh (GB)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 526 days.

(21) Appl. No.: 17/179,667

(22) Filed: Feb. 19, 2021

(65) Prior Publication Data

US 2022/0269887 A1 Aug. 25, 2022

(51) Int. Cl.
*G06V 10/22* (2022.01)
*G06F 3/0481* (2022.01)
*G06F 3/16* (2006.01)
*G06F 40/279* (2020.01)
*G06F 40/30* (2020.01)
*G06V 20/20* (2022.01)
*G06V 20/50* (2022.01)
*G10L 15/26* (2006.01)
*G10L 25/57* (2013.01)

(52) U.S. Cl.
CPC ............ *G06V 20/20* (2022.01); *G06F 3/0481* (2013.01); *G06F 3/165* (2013.01); *G06F 40/279* (2020.01); *G06F 40/30* (2020.01); *G10L 15/26* (2013.01); *G10L 25/57* (2013.01)

(58) Field of Classification Search
USPC ................ 382/100–103, 154–159, 170–224
See application file for complete search history.

(56) References Cited

U.S. PATENT DOCUMENTS

| 8,131,750 B2 | 3/2012 | Bathiche et al. |
| 8,914,820 B2 | 12/2014 | Newell |
| 10,354,141 B2 | 7/2019 | Spengler et al. |

(Continued)

OTHER PUBLICATIONS

Devam Chandra, Systems And Methods For Rendering Immersive Environments; Oct. 18, 2018 (Year: 2018).*

(Continued)

*Primary Examiner* — Marcellus J Augustin
(74) *Attorney, Agent, or Firm* — Raguraman Kumaresan

(57) ABSTRACT

A process of augmenting images of incident scenes with object descriptions retrieved from an audio stream. In operation, an electronic computing device detects an object of interest in an image captured corresponding to an incident scene and identifies an audio stream linked to an incident identifier of an incident that occurred at the incident scene. The electronic computing device then determines whether the audio stream contains an audio description of the detected object of interest. When it is determined that the audio stream contains the audio description of the detected object of interest, the electronic computing device generates a visual or audio prompt corresponding to the audio description of the detected object of interest and plays back the visual or audio prompt via a corresponding display or audio-output component communicatively coupled to the electronic computing device.

18 Claims, 5 Drawing Sheets

(56) References Cited

U.S. PATENT DOCUMENTS

| | | | |
|---|---|---|---|
| 11,721,208 B2* | 8/2023 | Jacobs | G06V 20/54 |
| | | | 701/117 |
| 2012/0249797 A1* | 10/2012 | Haddick | G04G 21/04 |
| | | | 701/491 |
| 2016/0378861 A1 | 12/2016 | Eledath et al. | |
| 2017/0364537 A1* | 12/2017 | Kariman | G06Q 10/0637 |
| 2018/0032612 A1* | 2/2018 | Kariman | G06F 16/164 |
| 2018/0176474 A1* | 6/2018 | Blanco | G06F 40/169 |
| 2018/0182142 A1* | 6/2018 | Lim | G06F 16/252 |
| 2018/0182170 A1* | 6/2018 | Lim | G06T 19/006 |
| 2018/0239991 A1 | 8/2018 | Weller et al. | |
| 2022/0121706 A1* | 4/2022 | Minsky | G11B 27/034 |

OTHER PUBLICATIONS

Li, Yong-jun, Method For Providing A Visual Acoustic Image And Electronic Device For Implementing The Method; Nov. 24, 2020 ( Year: 2020).*

A. McNamara and C. Kabeerdoss, "Mobile Augmented Reality: Placing Labels Based on Gaze Position," 2016 IEEE International Symposium on Mixed and Augmented Reality (ISMAR-Adjunct), Merida, 2016, pp. 36-37, doi: 10.1109/ISMAR-Adjunct.2016.0033.

Laurence Cliffe et al: "The Audible 1-20 Artefact", zzz, ACM, 2 Penn Plaza, Suite 701New YorkNY10121-0701USA, Sep. 18, 2019 (Sep. 18, 2019), pp. 176-182, XP058447072, DOI: 10.1145/3356590.3356617, ISBN: 978-1-4503-7297-8.

The International Search Report and the Written Opinion, corresponding patent application No. PCT/US2022/014194 filed: Jan. 28, 2022, dated May 4, 2022, all pages.

* cited by examiner

400

911 CALL RECORD — 405
410 — CAD ID: 24375
LOCATION: 123 MAIN STREET — 415

| 420 OBJECT | 425 ACTIONS APPLIED | 430 TIME WINDOW | 435 AUDIO DESCRIPTION |
|---|---|---|---|
| TABLE | KICKED | T1 | HE KICKED THE TABLE DOWN |
| FLOWER POT | THREW | T2 | AND THREW THE FLOWER POT AT ME AND MISSED |
| WALL | HIT | T2 | BUT HIT THE WALL BEHIND ME |

*FIG. 4*

DEVICE AND METHOD FOR AUGMENTING IMAGES OF AN INCIDENT SCENE WITH OBJECT DESCRIPTION

BACKGROUND

During an incident investigation, public safety professionals such as first responders, detectives, crime-scene investigators, medical examiners, evidence specialists etc., show up at the incident scene and work together to solve the incident. Securing the incident scene, interviewing the witnesses, documenting the incident scene in detail, and collecting physical evidence are some of the essential functions performed at the incident scene. However, public safety professionals can more efficiently perform their functions at the incident scene if they can readily identify particular physical spaces or objects from the incident scene as being more relevant for investigating or resolving an incident that occurred at the incident scene.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 4 illustrates an example of a record that is stored corresponding to a processed audio stream in accordance with some embodiments.

Figure 1:
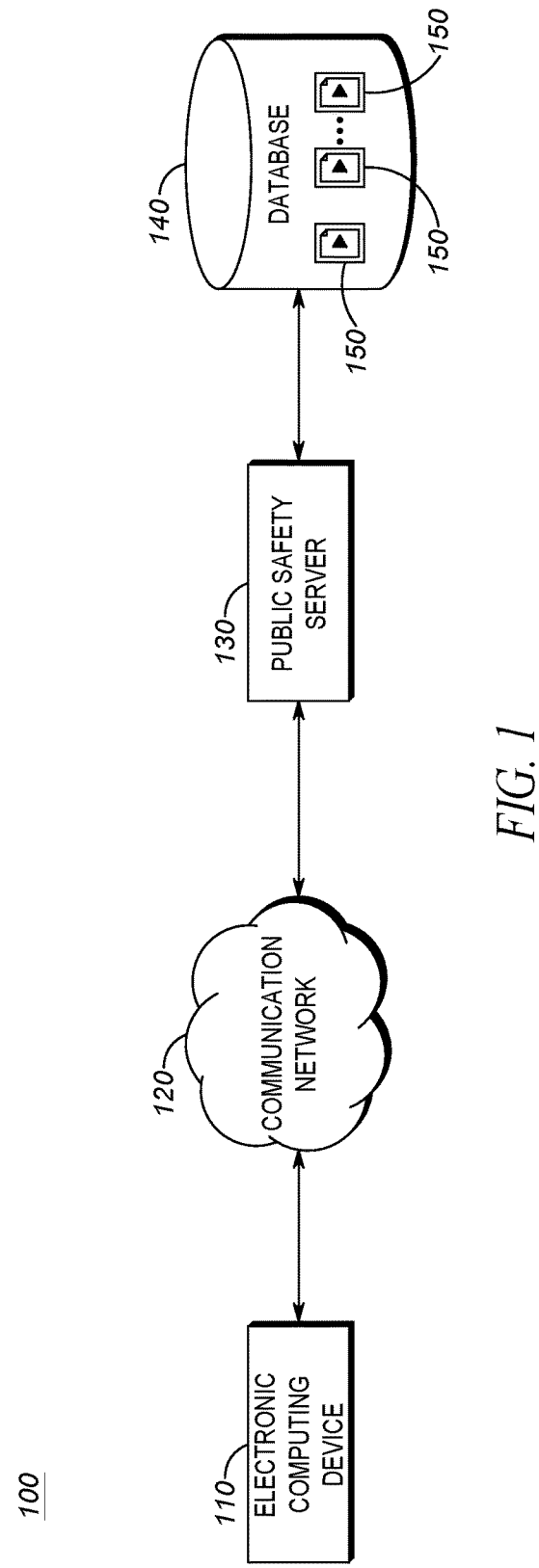
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One embodiment provides a method of augmenting an image of an incident scene with object description. The method comprises: detecting, at an electronic computing device, an object of interest in an image captured corresponding to an incident scene; identifying, at the electronic computing device, at least one audio stream linked to an incident identifier of an incident that occurred at the incident scene; determining, at the electronic computing device, whether the at least one audio stream contains an audio description of the detected object of interest; and in response to determining that the audio stream contains the audio description of the detected object of interest, generating, at the electronic computing device, a visual or audio prompt corresponding to the audio description of the detected object of interest and playing back the visual or audio prompt via a corresponding display or audio-output component communicatively coupled to the electronic computing device.

Another embodiment provides an electronic computing device. The electronic computing device comprises a display or audio-output component; and an electronic processor communicatively coupled to the display or audio-output device. The electronic processor is configured to: detect an object of interest in an image captured corresponding to an incident scene; identify at least one audio stream linked to an incident identifier associated with the incident scene; determine whether the at least one audio stream contains an audio description of the detected object of interest; and in response to determining that the audio stream contains the audio description of the detected object of interest, generate a visual or audio prompt indicating the audio description of the detected object of interest and playing back the visual or audio prompt via the display or audio-output component.

Each of the above-mentioned embodiments will be discussed in more detail below, starting with example system and device architectures of the system in which the embodiments may be practiced, followed by an illustration of processing blocks for achieving an improved technical method, device, and system for augmenting an image of an incident scene with object description. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including an electronic computing device 110 and a public safety server 130 configured to communicate with each other via a communication network 120. In accordance with some embodiments, the electronic computing device 110 may be operated by a public safety officer, for example, a police officer, a fire service responder, a emergency medical service responder, a detective, a crime scene investigator, a medical examiner, an evidence specialist, and the like. The electronic computing device 110 includes, but is not limited to, any suitable combination of electronic devices, communication devices, computing devices, portable electronic devices, mobile computing devices, portable computing devices, tablet computing devices, smart phones, wearable communication devices, mobile camera devices, drones, and robots. The electronic computing device 110 may also be incorporated into vehicles and the like, as a radio, an emergency radio, and the like. In some embodiments, the electronic computing device 110 further includes other types of hardware for emergency service radio functionality, including, but not limited to, push-to-talk ("PTT") functionality. In some embodiments, the electronic computing device 110 may be implemented as a smart glass which may be a virtual reality, an augmented reality, or a mixed reality glass that can be worn by a public safety officer while investigating an incident (e.g., a burglary, a robbery, a homicide, a fire accident etc.) at an incident scene. Although only one electronic computing device 110 is shown in FIG. 1, the communication system 100 may include multiple electronic computing devices 110 each operated by a respective public safety officer.

The public safety server 130 is any computing device that is adapted to communicate with the electronic computing device 110 to enable the electronic computing device 110 to augment images of incident scenes with object descriptions via a corresponding display or audio-output component coupled to the electronic computing device 110. The public safety server 130 maintains or has access to a database 140 that stores a plurality of audio streams 150. The audio streams 150 stored at the database 140 may represent any form of audio that is recorded in relation to a particular incident either in real-time or after occurrence of the incident. In accordance with some embodiments, each audio stream 150 is linked to or associated with an incident identifier and further corresponds to an audio recording of an emergency call. As an example, the emergency call is a 911 call made by a caller to report a particular incident and answered by an operator at a public safety answering point (not shown). In this example, the public safety answering point may include an audio recording device that has permissions to record a 911 call and store an audio stream 150 (e.g., in the form of an audio file or other suitable data format) corresponding to the recorded 911 call at the database 140. Also, the public safety answering point may include a dispatch terminal that automatically or in response to an input from the operator, assigns an incident identifier (e.g., a computer aided dispatch (CAD) identifier) to each incident reported via the 911 call. Accordingly, when the audio stream 150 is stored at the database 140, the audio stream 150 is further linked to or associated with (e.g., stored as a metadata) a unique incident identifier that identifies a particular incident reported via a corresponding 911 call.

In one embodiment, one or more of the audio streams 150 stored at the database 140 correspond to an audio or video recording of an interview conducted in-person or over a call by a public safety officer in relation to a particular incident. For example, a public safety officer responding to an incident might have interviewed a witness regarding the details (e.g., description of objects found at the incident scene, actions applied to the objects, sequence of actions, suspect identity etc.) of an incident that took place at an incident scene. In this example, a device such as the electronic computing device 110 operated by the public safety officer may be manually or automatically activated to record conversations exchanged between the public safety officer and the witness. The recorded conversations are then stored as an audio stream 150 at the database 140 and further linked to or associated with an incident identifier of the incident for which the interview was conducted. In other embodiments, one or more of the audio streams 150 stored at the database 140 may correspond to a recording of communications exchanged between public safety officers on a talk group call, for example, while responding to or investigating an incident assigned to the public safety officers.

In accordance with some embodiments, the public safety server 130 is configured to transmit a copy of one or more of the audio streams 150 stored at the database 140 in response to receiving a request from the electronic computing device 110 to enable the electronic computing device 110 to augment an image of an incident scene with object description via a corresponding display or audio-output component coupled to or included in the electronic computing device 110. In one embodiment, the public safety server 130 transmits information that is extracted from processing the audio streams 150 instead of transmitting a raw copy of the audio streams 150 stored at the database 140. In this embodiment, the public safety server 130 processes each audio stream 150 stored at the database 140 by converting the audio stream 150 to a digital text string via a speech-to-text engine. Then the public safety server 130 semantically processes (e.g., via a natural language processing (NLP) engine) the digital text string to identify key terms in the digital text string, where each key term represents an object (e.g., an object found at the incident scene and described by a caller in an emergency call while reporting the incident) or an action (e.g., an action witnessed by the caller and described in the emergency call) applied to the object. The public safety server 130 also identifies for each key term at least one time window from the audio stream 150 during which the key term occurs within the audio stream 150. For example, the public safety server 130 may identify a first time window for the key term representing an object and a second time window for the key term representing an action applied to the object. The public safety server 130 then stores a record (e.g., record 400 shown in FIG. 4) identifying the key terms representing the objects and/or actions applied to the object and the corresponding time windows within the audio stream 150. In this embodiment, when the public safety server 130 receives a request from the electronic computing device 110 for augmenting an image of an incident scene with object description, the public safety server 130 transmits a record identifying the key terms representing the objects and/or actions applied to the object and the corresponding time windows. In other words, in this embodiment, the public safety server 130 transmits a record corresponding to the processed audio stream 150 rather than the raw audio stream 150 stored in the database 140.

In accordance with embodiments, the electronic computing device 110 detects an object of interest in an image (e.g., an image captured within the field-of-view of a camera included in the electronic computing device 110) captured corresponding to an incident scene and identifies at least one audio stream (e.g., an audio stream 150 stored at the database 140) linked to an incident identifier associated with the incident scene. The electronic computing device 110 then determines whether the identified audio stream 150 contains an audio description of the detected object of interest. When the electronic computing device 110 determines that the audio stream 150 contains the audio description of the detected object of interest, the electronic computing device 110 generates a visual or audio prompt corresponding to the audio description of the detected object of interest and further plays back the visual or audio prompt via a corresponding display or audio-output component communicatively coupled to the electronic computing device 110.

The electronic computing device 110 may include one or more wired or wireless communication interfaces for communicating with the public safety server 130 and other communication devices in the system 100 via the communication network 120. The communication network 120 includes wireless and wired connections. For example, the communication network 120 may be implemented using a wide area network, such as the Internet, a local area network, such as a Wi-Fi network, and personal area or near-field networks, for example a Bluetooth™ network. Portions of the communications network 120 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

Figure 2:
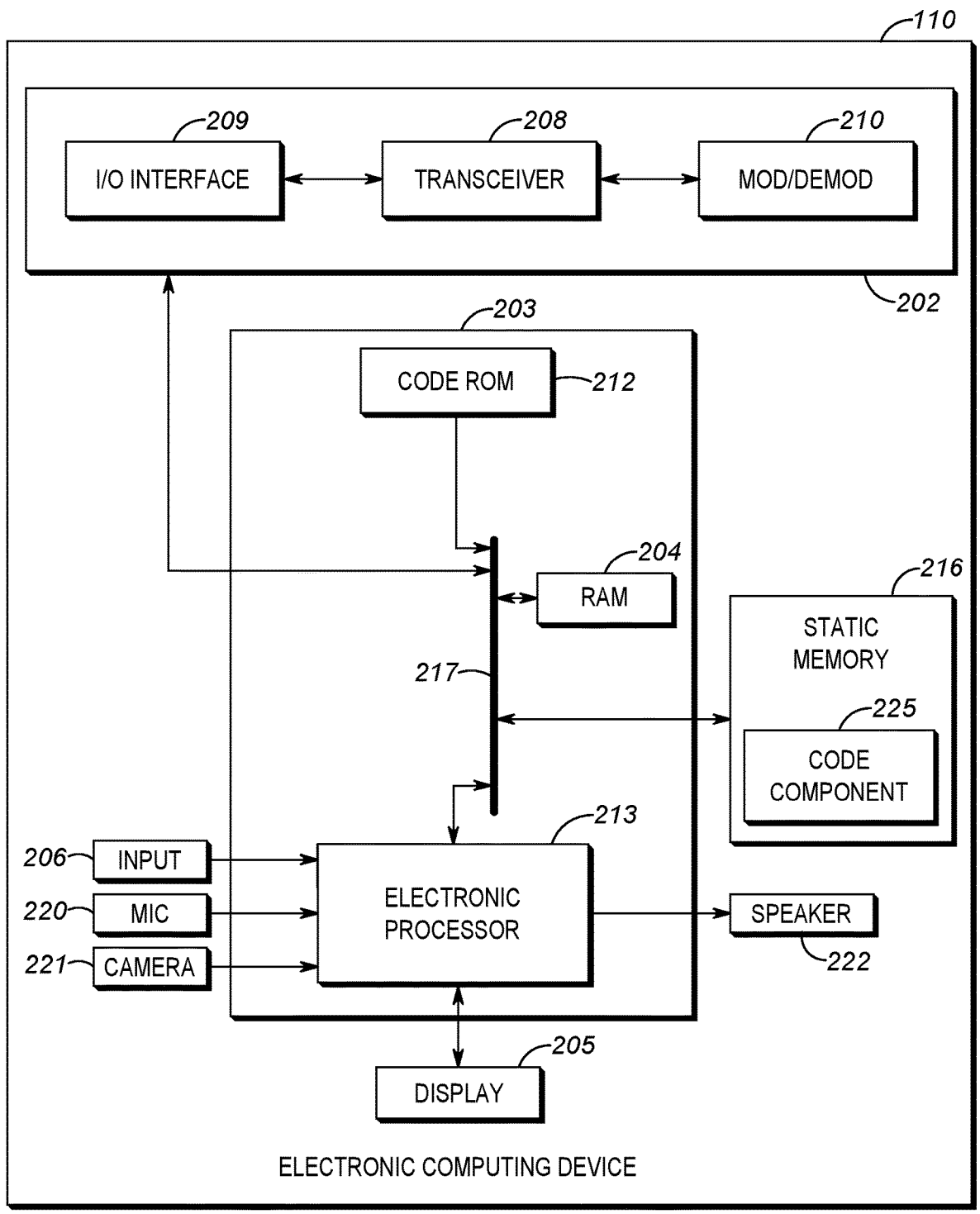
FIG. 2 is a block diagram of an electronic computing device shown in FIG. 1 in accordance with some embodiments.

FIG. 2 is an example functional block diagram of an electronic computing device operating within the communication system 100 in accordance with some embodiments. The electronic computing device performs the functions of the electronic computing device 110 shown in FIG. 1 and may be embodied in computing devices not illustrated in FIG. 1, and/or may be a distributed computing device across two or more of the foregoing (or multiple of a same type of one of the foregoing) and linked via a wired and/or wireless communication link(s). While FIG. 2 represents an electronic computing device 110 described above with respect to FIG. 1, depending on the type of electronic computing device 110, the electronic computing device 110 may include fewer or additional components in configurations different from that illustrated in FIG. 2.

As shown in FIG. 2, the electronic computing device 110 includes a communications unit 202 coupled to a common data and address bus 217 of a processing unit 203. The communications unit 202 sends and receives data to and from other network entities (e.g., public safety server 130) in the system 100. The communications unit 202 may include one or more wired and/or wireless input/output (I/O) interfaces 209 that are configurable to communicate, for example, with the public safety server 130 in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202, such as for receipt by the public safety server 130. The electronic processor 213 has ports for coupling to the electronic display 205, user input interface device 206, microphone 220, camera 221, and the speaker 222.

Figure 3:
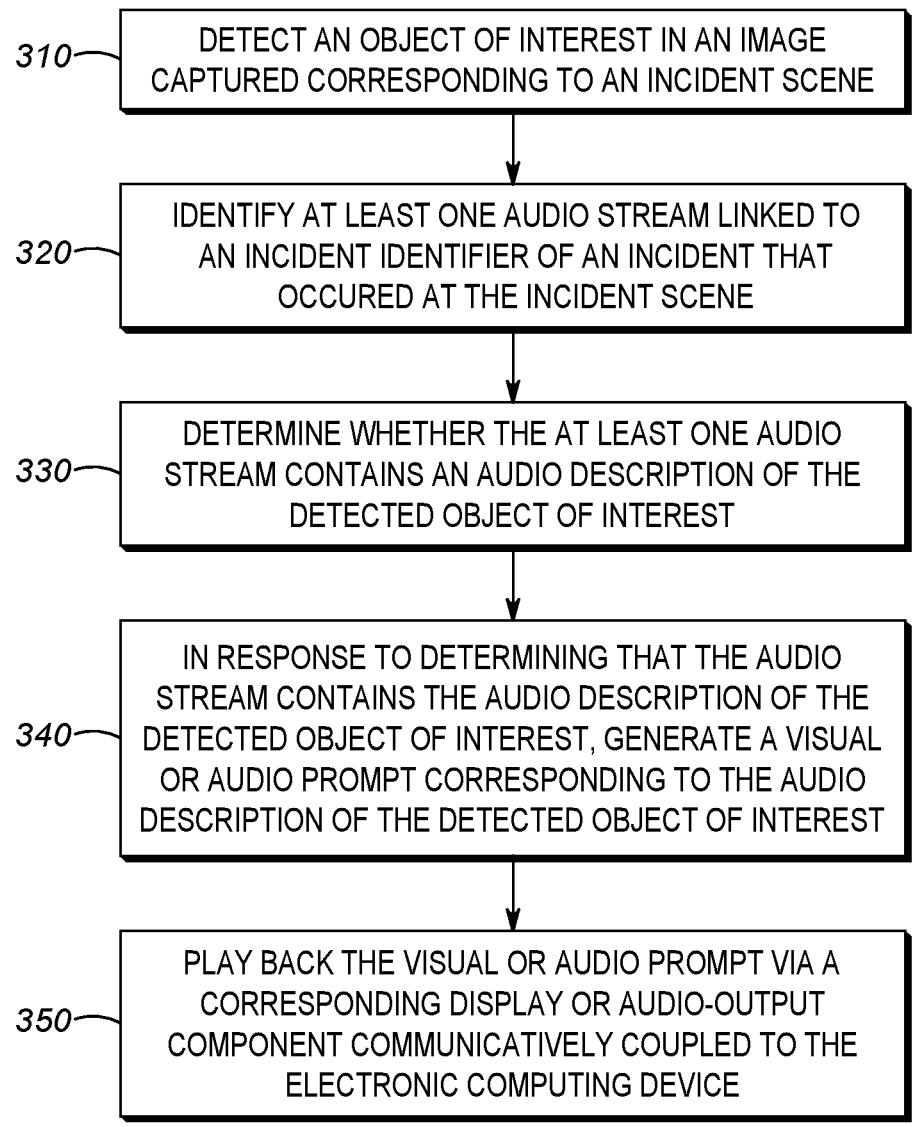
FIG. 3 illustrates a flowchart of a process of augmenting an image of an incident scene with object description in accordance with some embodiments.

Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

The electronic computing device 110 further includes or otherwise is communicatively coupled to an electronic display 205 that is provided for displaying images, video, and/or text (e.g., a visual prompt corresponding to audio description of objects detected from images captured corresponding to an incident scene) to a user operating the electronic computing device 110. The electronic display 205 may be, for example, a liquid crystal display (LCD) screen or an organic light emitting display (OLED) display screen. In some embodiments, a touch sensitive input interface may be incorporated into the display 205 as well, allowing a user operating the electronic computing device 110 to interact with content provided on the display 205. A soft PTT input may also be provided, for example, via such a touch interface. In one embodiment, when the electronic computing device 110 is implemented as a smart glass such as an augmented reality glass, the electronic display 205 may take form of a personal display that is integrated into the smart glass for displaying images or video captured within a field-of-view (e.g., at an incident scene) of a user wearing the smart glass. The smart glass may provide a virtual reality interface in which a computer-simulated reality electronically replicates an environment (e.g., an incident scene assigned to the user for investigation) with which the user may interact. In some embodiments, the smart glass may provide an augmented reality interface in which a direct or indirect view of real-world environments in which the user is currently disposed are augmented or supplemented by additional computer-generated sensory input such as sound, video, images, graphics, location data, or other information, for example, corresponding to audio descriptions of objects of interest detected in images captured corresponding to an incident scene within the user's environment. In still other embodiments, the smart glass may provide a mixed reality interface in which electronically generated objects or object descriptions (e.g., as described by a 911 caller to report an incident that occurred at the incident scene in which the objects were found) corresponding to objects detected within a field-of-view of the user are inserted in a direct or indirect view of real-world environments in a manner such that they may co-exist and interact in real time with the real-world environment and real world objects.

In accordance with some embodiments, the electronic computing device 110 generates a visual prompt corresponding to an audio description (e.g., description retrieved from one of the audio streams 150) related to an object of interest that is detected from an image captured corresponding to an incident scene. The visual prompt may be provided in text, image, video, or other visual forms. The electronic computing device 110 plays back the visual prompt via the electronic display 205. As an example, during playback, the electronic computing device 110 may overlay a scrolling text corresponding to the audio description of an object in proximity to a graphical representation of the object displayed on the electronic display 205.

The electronic computing device 110 may also include one or more input devices 206, for example, keypad, pointing device, touch-sensitive surface, button, and the like. In accordance with some embodiments, the input device 206 is configured to receive an indication from a user of a selection of a particular object from different objects (i.e., objects detected from an incident scene) that are displayed via the display 205 of the electronic computing device 110. For example, when the electronic computing device 110 is implemented as a smart glass, an additional user interface mechanism such as a touch interface or gesture detection mechanism (e.g., an eye-tracking device) may be provided at the smart glass that allows the user to interact with the display elements (e.g., objects or object descriptions corresponding to objects detected within a field-of-view of a user) or projected into the user's eyes. As an example, the smart glass may include a touch panel on an external surface of its housing to enable a user to select one or more objects (e.g., objects detected from an image captured corresponding to an incident scene) displayed on a display component (e.g., display 205) of the glass. As another example, the smart glass may include an eye-tracking device comprising one or more sensors configured to determine an eye-gaze direction including, but not limited to, one or more cameras arranged to acquire images of eyes of a user operating the electronic computing device 110. The electronic computing device 110 may automatically select an object in the eye-gaze direction of the user determined by the eye-tracking device in order to provide audio description (i.e., retrieved from the audio stream 150) corresponding to the selected object. In other embodiments, a display 205 and input interface 206 may be provided at another portable device operated by the user for interacting with the content displayed on the smart glass.

The electronic computing device 110 may include a microphone 220 for capturing audio from a user and/or other environmental or background audio that is further processed by processing unit 203 in accordance with the remainder of this disclosure and/or is transmitted as voice or audio stream data, or as acoustical environment indications, by communications unit 202 to other devices. In one embodiment, a user may provide via the microphone 220 a voice command indicating a selection of one or more of the objects of interest displayed corresponding to the incident scene for purposes of obtaining audio descriptions corresponding to the selected objects.

The electronic computing device 110 further includes or is otherwise coupled to a camera 221 that captures images (still or moving images) corresponding to its field-of-view for further processing by the processing unit 203. In accordance with embodiments, the image or images captured by the camera 221 are processed (either locally at the electronic computing device 110 or at another network device within the system 100) via an image analytics engine (executable code corresponding to the engine may be stored at the static memory 216) to identify an instance of an object. For example, the image analytics engine may include a plurality of object classifiers, where each object classifier may be particularly trained to detect a particular type of object (e.g., a person, watch, cloth, backpack, shoe, wall, furniture, flower, flower pot, animal, blood splatter, etc.) or parts of object (e.g., individuals parts of a broken table such as table leg and table surface). The image analytics engine then provides to the electronic computing device 110 information identifying one or more objects detected from the image. In accordance with some embodiments, the electronic computing device 110 uses this information identifying the objects to retrieve an audio description of the same object from an audio stream 150 that is linked to an incident identifier of an incident associated with the incident scene. The electronic computing device 110 then generates a visual or audio prompt corresponding to the audio description of the detected object of interest for playback via a corresponding display 205 or audio-output component (i.e., speaker 222) communicatively coupled to the electronic computing device 110.

An audio-output component such as a speaker 222 may be present for reproducing audio that is decoded from voice or audio streams of calls received via the communications unit 202 from other devices, from digital audio stored at the electronic computing device 110, or may playback alert tones or other types of pre-recorded audio. In accordance with some embodiments, the electronic computing device 110 generates an audio prompt corresponding to an audio description (e.g., retrieved from one of the audio streams 150) related to an object of interest that is detected from an image captured corresponding to an incident scene. The electronic computing device 110 plays back the audio prompt corresponding to the audio description via the speaker 222.

Turning now to FIG. 3, a flowchart diagram illustrates a process 300 of augmenting an image of an incident scene with object description. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 213 implemented at the electronic computing device 110.

The electronic computing device 110 may execute the process 300 at power-on, at some predetermined periodic time period thereafter, in response to a trigger raised locally at the electronic computing device 110 via an internal process or via an input interface (e.g., input interface 206) or in response to a trigger from an external device (e.g., public safety server 130) to which the electronic computing device 110 is communicably coupled, among other possibilities. As an example, the electronic computing device 110 is programmed to automatically trigger execution of the process 300 when a user such as a first responder operating the electronic computing device 110 shows up at a geographical area encompassing an incident scene to investigate an incident that occurred at the incident scene. In this example, the electronic computing device 110 may compare a current location of the user assigned to investigate or respond to an incident with a pre-stored location representing an incident location of the incident. When the current location of the user matches the pre-stored location, the electronic computing device 110 automatically begins executing the process 300 of augmenting an image of the incident scene with object description retrieved from an audio stream 150 linked to the same incident. As another example, the electronic computing device 110 may begin executing the process 300 of augmenting an image of the incident scene only in response to detecting a predefined user input received via an input device 206 of the electronic computing device 110.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

At block 310, the electronic computing device 110 detects an object of interest in an image captured corresponding to the incident scene. In accordance with embodiments, the electronic computing device 110 begins the execution of the process 300 by activating a camera 221 coupled to the electronic computing device 110 in response to a trigger locally generated at the electronic computing device 110. The trigger may be locally generated at the electronic computing device 110 in response to detecting a user input and/or detecting that a user operating the device is located in a predefined geographical area encompassing an incident scene associated with an incident to which the user is assigned to. The camera 221 upon activation captures one or more images within its field-of-view that corresponds to a real-world space such as the incident scene in which the incident has occurred. In accordance with embodiments, the image or images captured by the camera 221 is processed either locally at the electronic computing device 110 or at another network device within the system 100 via an image analytics engine to identify an instance of an object of interest from the image or images. For example, the image analytics engine may include a plurality of object classifiers, where each object classifier may be particularly trained to detect a particular type of object (e.g., a person, watch, cloth, backpack, shoe, wall, furniture, flower, pot, animal, blood splatter, etc.) or parts of an object that may be relevant for investigating a particular type of incident scene. As an example, the image analytics engine may employ object classifiers to detect objects such as furniture with an incident scene when the incident scene corresponds to an indoor environment. The image analytics engine then provides information identifying one or more objects of interest detected from the processed image to the electronic computing device 110.

If the electronic computing device 110 does not detect any object of interest within the field-of-view of the camera 221, the electronic computing device 110 may adjust the camera field-of-view automatically or by requesting the user to change his/her position and/or move to another area within the incident scene. The electronic computing device 110 then processes an image captured corresponding to the adjusted field-of-view in order to detect objects of interest from the image. The electronic computing device 110 may repeat this process to scan the entire incident scene to detect multiple objects of interest.

Next, at block 320, when the electronic computing device 110 detects an object of interest in an image captured corresponding to the incident scene, the electronic computing device 110 identifies at least one audio stream 150 linked to an incident identifier of an incident that occurred at the incident scene. In accordance with some embodiments, the electronic computing device 110 transmits a request to a public safety server 130 to identify one or more audio streams 150 that are linked to the incident identifier of the incident that occurred at the incident scene. The request includes authentication credentials of the electronic computing device 110, location of the incident scene (e.g., address, global position system (GPS) coordinates, building name, landmark etc.), and an incident identifier (e.g., a CAD identifier) assigned to the incident associated with the incident scene. In response, the public safety server 130 verifies the authentication credentials of the electronic computing device 110 to determine whether the electronic computing device 110 is authorized by an appropriate agency (e.g., police agency) to access information related to audio streams 150 that are linked to the incident identifier identified in the request.

In one embodiment, after verifying the authentication credentials of the electronic computing device 110 and determining that the electronic computing device 110 is authorized by an appropriate agency, the public safety server 130 searches the database 140 and identifies one or more audio streams 150 that are linked to the incident identifier included in the request received from the electronic computing device 110. The public safety server 130 then transmits a response to the electronic computing device 110, where the response identifies the audio streams 150 that are linked to the incident identifier. In one embodiment, the response further includes a copy of the audio streams 150 that are identified as linked to the incident identifier. Alternatively, the response may include an audio stream identifier (instead of a copy of the audio stream 150) uniquely identifying the one or more audio streams 150 that are linked to the incident identifier. In this case, the response may further include a resource identifier, for example, a uniform resource locator (URL) of a resource (e.g., a database 140) from which the one or more audio streams 150 linked to the incident stream can be retrieved by the electronic computing device 110. In yet another embodiment, the public safety server 130 transmits a response including information that is extracted based on processing the audio streams 150 linked to the incident identifier instead of a copy of the audio streams 150 linked to the incident identifier. In this embodiment, the public safety server 130 processes each audio stream 150 stored at the database 140 by converting the audio stream 150 to a digital text string via a speech-to-text engine. Then the public safety server 130 semantically processes (e.g., via a natural language processing engine) the digital text string to identify key terms in the digital text string, where each key term represents an object (e.g., an object found at the incident scene and described by a caller in an emergency call while reporting the incident) or an action (i.e., an action witnessed by the caller and described in the emergency call) applied to the object. The public safety server 130 also identifies for each key term at least one time window from the audio stream 150 during which the key term occurs within the audio stream 150. For example, the public safety server 130 may identify a first time window for the key term representing an object and a second time window for the key term representing an action applied to the object. The public safety server 130 then stores a record identifying the key terms representing the objects and/or actions applied to the object and the corresponding time windows within the audio stream 150. In this embodiment, when the public safety server 130 receives a request from the electronic computing device 110 to identify the audio stream 150, the public safety server 130 transmits a record identifying the key terms representing the objects and/or actions applied to the object and the corresponding time windows. In other words, in this embodiment, the public safety server 130 transmits a record corresponding to the processed audio stream 150 rather than a copy of the raw audio streams 150 stored in the database 140.

In embodiments where the electronic computing device 110 receives a raw audio stream (i.e., audio stream 150 as stored at the database 140) linked to the incident identifier from the public safety server 130 or alternatively retrieves the raw audio stream directly from a particular resource identified by the resource identifier included in the response received from the public safety server, the electronic computing device 110 processes the raw audio stream by converting the audio stream 150 to a digital text string via a speech-to-text engine. Then the electronic computing device 110 semantically processes (e.g., via a natural language processing (NLP) engine) the digital text string to identify key terms in the digital text string, where each key term represents an object (e.g., an object found at the incident scene and described by a caller in an emergency call while reporting the incident) or an action (i.e., an action witnessed by the caller and described in the emergency call) applied to the object. The electronic computing device 110 also identifies for each key term at least one time window from the audio stream 150 during which the key term occurs within the audio stream 150. For example, the electronic computing device 110 may identify a first time window for the key term representing an object and a second time window representing an action applied to the object. The electronic computing device 110 then stores at the static memory 216 a record 400 (see FIG. 4) identifying the key terms representing the objects and/or actions applied to the object and the corresponding time windows within the audio stream 150.

As shown in FIG. 4, the record 400 includes information that is extracted by the electronic computing device 110 and/or the public safety server 130 from processing an audio stream 150 that is identified at block 320 as being linked to the incident identifier of the incident that occurred at the incident scene. The record 400 may be stored at the database 140 and/or locally at the static memory 216 of the electronic computing device 110 in any suitable data format or structure. The record 400 may identify a source 405 of an audio stream 150, incident identifier 410 identifying the incident to which the audio stream 150 is linked to, and a location of the incident scene in which the incident occurred. As illustrated by the example shown in FIG. 4, the source 405 of the audio stream 150 is identified as a 911 call record. Alternatively, the source 405 of the audio stream 150 may be an audio or video recording of an interview that was conducted in relation to the incident associated with the incident identifier. The incident identifier 410 may correspond to a computer aided dispatch (CAD) identifier assigned to an incident reported at a public safety answering point. The location 415 may include one or more of an address, GPS coordinate, building name, landmark etc., which identifies a geographical area encompassing the incident scene. The record 400 further includes an object field 420, actions applied field 425, time window field 430, and audio description field 435. The object field 420 includes a key term representing an object described in the digital text string of the audio stream 150. The actions applied field 425 identifies a key term representing one or more actions applied to each object included in the object field 420. The time window field 430 identifies a time segment within a playback of the audio stream 150 during which the key term representing the object and/or an action applied to the object occurred within the audio stream 150. The audio description field 435 contains an audio or text portion included in the audio stream 150 corresponding to the time window in which the key terms representing the object and/or actions applied to the object occur within the audio stream 150.

As illustrated by the example shown in FIG. 4, an audio stream 150 from a 911 call recording source includes an audio description "He kicked the table down." In this example, the NLP engine processes the 911 call recording and identifies that the key term "table" corresponds to an object and responsively includes the key term "table" in the object field 420. Similarly, the NLP engine identifies that the key term "kicked" (e.g., a verb) corresponds to an action applied to the object "table" and responsively includes the key term "kicked" in the actions applied field 425. The time window in which the key terms "table" and "kicked" occur during a playback of the audio stream 150 is also identified and included in the time window field 430. In the example shown in FIG. 4, the time window is represented as 'T1' for illustration purposes, but may be represented in any suitable format readable by the electronic computing device 110. Time window 'T1' may identify a particular duration (e.g., 25th second to 40th second) or a time range during a playback of the 911 call recording in which the respective key terms identifying the object and/or actions applied to the object are recorded. In the example shown in FIG. 4, the audio description "He kicked the table down" corresponding to the time window "T1" (in which the key terms "table" and kicked" appear within the audio stream 150) is included in the audio description field 435.

In some embodiments, the electronic computing device 110 may assign an indicator (not shown) to each of the objects (based on key terms identifying the objects and/or actions applied to the objects) included in the object field 420. The indicator (e.g., represented using a number, letter, symbol, color, or a pattern) identifies an order or sequence in which the action identified in the action applied field 425 was applied to a particular object included in the object field 420 relative to other objects included in the object field 420. In the example shown in FIG. 4, the electronic computing device 110 may assign an indicator "1" to an object "table," "2" to an object "flower pot," and "3" to an object "wall" to indicate the order in which the actions "kicked," "threw," and "hit" were respectively applied to the objects "table," "flower pot," and "wall." In other words, the assignment of the indicators, for example, numbering "1," "2," and "3," respectively to the objects "table," "flower pot," and "wall" indicate that the object "table" was interacted with or acted upon (e.g., by a suspect) prior to the objects "flower pot" and "wall" when the incident (i.e., as described by a caller in the 911 call record) occurred at the incident scene.

In accordance with embodiments, the electronic computing device 110 uses the record 400 to retrieve an audio description corresponding to a particular object and further to playback a visual or audio prompt of the audio description for the object to a user operating the electronic computing device 110.

Returning to FIG. 3, after the electronic computing device 110 identifies, at block 320, at least one audio stream 150 that is linked to the incident identifier of the incident that occurred at the incident scene, the electronic computing device 110 determines, at block 330, whether the at least one audio stream 150 contains an audio description of the detected object of interest. In accordance with embodiments, the electronic computing device 110 determines whether the audio stream 150 identified at block 320 contains an audio description of the detected object of interest by comparing a key term identifying the object of interest detected at block 310 with the key terms extracted from processing the audio stream 150 identified at block 320. In one embodiment, the electronic computing device 110 compares the key term identifying the detected object of interest with the key terms included in the object field 420 of the record 400. When the key term identifying the detected object of interest matches with one or more of the key terms extracted from processing the audio stream 150 identified at block 320, the electronic computing device 110 determines that the audio stream 150 identified at block 320 contains the audio description of the detected object of interest. For instance, if the object of interest detected at block 310 from an image captured corresponding to an incident scene is a "table," then the electronic computing device 110 determines whether the object field 420 includes any key term matching the key term "table" representing the object of interest detected from the image captured corresponding to the incident scene. As illustrated by the example shown in FIG. 4, the record 400 includes a key term "table" that matches with the key term "table" identifying the detected object of interest. In this example, the electronic computing device 110 determines that the audio stream 150 (i.e., 911 call record) contains an audio description for the "table."

On the other hand, when the key term identifying an object of interest detected at block 310 does not match with key terms extracted from a particular audio stream 150 identified at block 320, the electronic computing device 110 may compare the key term identifying the detected object of interest with key terms extracted from another audio stream 150 that is identified at block 320 as being linked to the same incident identifier (i.e., when multiple audio streams 150 are identified at block 320 as being linked to the incident identifier associated with a current incident scene).

Next, at block 340, when the electronic computing device 110 determines that the audio stream 150 contains the audio description of the object of interest, the electronic computing device 110 generates a visual or audio prompt corresponding to the audio description of the detected object of interest. In accordance with some embodiments, the electronic computing device 110 generates a visual or audio prompt by selecting a first time window identified corresponding to the key term (e.g., key term included in the object field 420) that matches the key term identifying the detected object of interest. The electronic computing device 110 then retrieves a portion of the audio stream 150 corresponding to the first time window. In accordance with some embodiments, the electronic computing device 110 further selects a second time window (which may overlap with the first time window) corresponding to a key term (e.g., key term included in actions applied field 425) that represents the action applied to the detected object of interest and retrieves a portion of the audio stream 150 corresponding to the selected second time window. In these embodiments, the electronic computing device 110 generates a visual prompt or audio prompt that includes portions of the audio stream 150 corresponding to both the first and second time windows. In other words, in these embodiments, the visual prompt or audio prompt not only contains a description identifying the object, but also a description identifying a specific action that was applied to the object during a particular incident (i.e., as described by a 911 caller reporting the incident). As an example, referring to FIG. 4, the electronic computing device 110 may select time window "T1" in the time window field 430 because the key term "table" in the object field 420 matches with the key term "table" of an object of interest detected at block 310 and further because the time window "T1" corresponds to the key term "table" in the object field 420. Similarly, the electronic computing device 110 may select time window "T1" in the time window field 430 because the time window "T1" also corresponds to the key term "kicked" in the actions applied field 425 identifying the actions applied to the object "table." After selecting the time window "T1," the electronic computing device 110 retrieves a portion of the audio stream 150 (that includes a description identifying the object as well as the description of the action applied to the object) corresponding to the time window "T1." In the example shown in FIG. 4, the electronic computing device 110 retrieves the audio description "He kicked the table down" from the audio description field 435 corresponding to the selected time window "T1." The electronic computing device 110 then generates a visual or audio prompt corresponding to the audio description "He kicked the table down" for the object of interest "table" detected from the image captured corresponding to the incident scene. Additionally, in embodiments where the electronic computing device 110 assigns an indicator to each object indicating an order in which a particular action was applied to a particular object relative to other objects (e.g., objects included in object field 420), the electronic computing device 110 also includes the assigned indicator to the visual or audio prompt corresponding to the audio description of the detected object of interest.

Next, at block 350, the electronic computing device 110 outputs the visual or audio prompt via a corresponding display (e.g., electronic display 205) or audio-output component (e.g., speaker 222) communicatively coupled to the electronic computing device 110. In one embodiment, the electronic computing device 110 plays back a visual prompt corresponding to audio description "He kicked the table down" to describe an object of interest "table" that is detected from an image captured corresponding to the incident scene. In this embodiment, the visual prompt may be overlaid in the form of a scrolling text, image, video, or graphical format in proximity to a screen space on the display 205 where the object of interest is displayed. The object of interest may be rendered on the display substantially in real-time during capturing of an image (via the camera 221) corresponding to the incident scene containing the object of interest. In another embodiment, the electronic computing device 110 plays back an audio prompt corresponding to the audio description "He kicked the table down" to describe an object of interest "table" that is detected from an image captured corresponding to the incident scene. The visual or audio prompt may also provide an indicator (e.g., "1," "2," "3" etc.) identifying the order or sequence in which the actions were applied (e.g., as described by a caller while reporting the incident) to the objects found in the incident scene.

In one embodiment, the electronic computing device 110 plays back the visual or audio prompt corresponding to the audio description in response to determining that the object of interest is within a field-of-view of a user operating the electronic computing device 110 or alternatively in response to determining that the object of interest is located within a predefined proximity distance from the user operating the electronic computing device 110. In another embodiment, the electronic computing device 110 plays back the visual prompt and/or audio prompt corresponding to the audio description in response to receiving a user input via an input interface 206 selecting the detected object of interest.

In accordance with embodiments, when the electronic computing device 110 detects multiple objects of interest in an image or images captured corresponding to the incident scene, the electronic computing device 110 executes the functions described with reference to blocks 320 through 350 for each object of interest detected in the image or images captured corresponding to the incident scene and further plays back visual or audio prompt representing object description corresponding to each of the detected objects of interest. For example, as shown in FIG. 4, the electronic computing device 110 has detected three objects "table," "flower pot," and "wall." In this case, the electronic computing device 110 executes the functions described with reference to blocks 320 through 350 to playback visual or audio prompt representing object description corresponding to each of the three objects "table," "flower pot," and "wall" detected at the incident scene.

Figure 5:
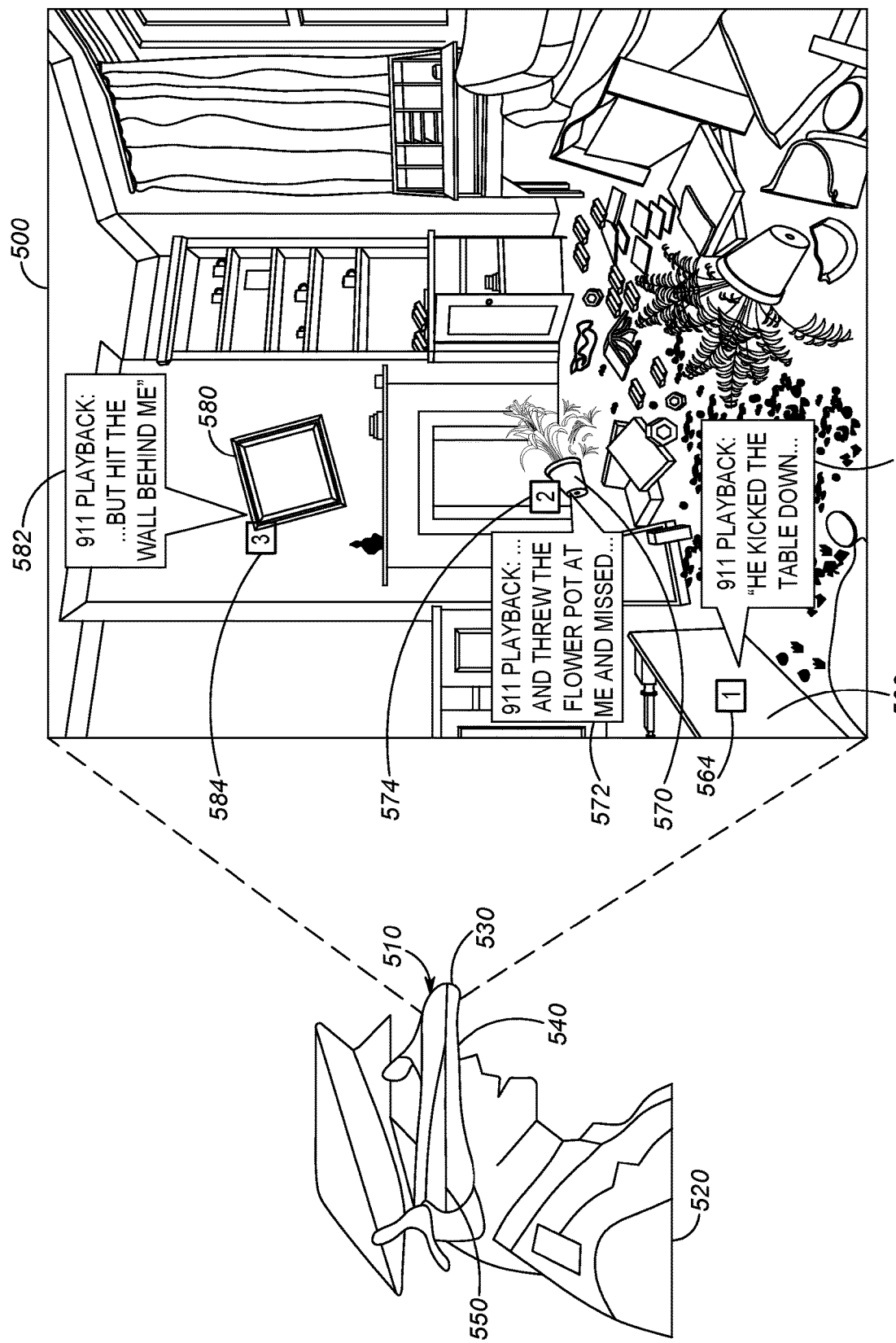
FIG. 5 illustrates an example image of an incident scene which can be augmented with object descriptions in accordance with some embodiments.

FIG. 5 illustrates an example image of an incident scene 500 which can be augmented with object descriptions in accordance with some embodiments. A device 510 (similar to electronic computing device 110 shown in FIG. 2) is shown being used and/or worn by a user 520, for example, a first responder assigned to respond to an incident that has occurred at the incident scene 500. The device 510 is a wearable device, for example, a heads-up display device and/or an augmented reality device (e.g., an augmented reality glass or smart glass) that may be worn by the user 520 at an incident scene 500 to automatically obtain an audio description retrieved from audio streams associated with an incident that occurred at the incident scene, where the audio description is further related to objects of interest found at the incident scene 500.

The device 510 includes a housing 540 which is wearable by the user 520, for example in a manner similar to heads-up display, glasses, and the like. The device 510 also includes, among other components shown in FIG. 2, a camera 530 (e.g., an augmented reality camera) which functions similar to camera 221 shown in FIG. 2. The camera 530 may be mounted in a forward-facing direction (e.g., away from the user 520) such that images captured by the camera 530 generally correspond to a direction in which the user 520 is looking with their eyes. This further enables the user 520 to receive visual or audio prompt representing audio description of objects of interest found at the incident scene in a direction in which the user 520 is focused on. The device 510 further includes an electronic display (not shown) which functions similar to electronic display 205 shown in FIG. 2. The display is mounted to the housing 540 to be viewable by the user 520 and that images captured by the image, and/or images augmented with audio description of objects of interest, may be displayed at the display such that the user 520 may view the environment covering the incident scene 500 in a forward-facing direction using the device 510 in an augmented fashion. The device 510 may be generally transparent such that the user 520 may view the environment in a forward-facing direction through the display, with a field-of-view of the camera 530 corresponding to the field-of-view of the user 520 through the display. This ensures that objects in the field-of-view of the camera 530 and objects displayed through the device 510 may generally be in a similar position. The device 510 detects objects in images from the camera 530 and controls the display to indicate the objects, for example, the indications including, but not limited to, one or more outline of the recognized objects, text, icons, and the like.

The device 510 also includes an input device 550 that functions similar to the input device 550. For example, the input device 550 may comprise a touch panel mounted on an external surface of the housing 540, for example, a side of the housing 540 where the touch panel is located at a side of the head of the user 520 when the device 510 is in use, such that the touch panel can receive touch input from the user 520, for example, to enable the user 520 to select a particular one of the objects displayed on the display and to further obtain a visual or audio prompt corresponding to an audio description (retrieved from an audio stream 150 linked to the incident) of the selected object.

As shown in FIG. 5, the incident scene 500 represents an indoor environment such as a living room of a house in which an incident (e.g., burglary) has occurred and further reported by a caller (e.g., resident of the house) via a 911 call. An audio stream 150 corresponding to a recording of the 911 call is stored in a database (e.g., database 140) accessible by the device 510. In this example, the user 520 is a first responder assigned to respond to the incident reported by the caller. When the user 520 arrives at the incident scene 500 to investigate the assigned incident, the device 510 may begin to execute the process 300 described with reference to FIG. 3. In particular, the device 510 enables the camera 530 to begin capturing images corresponding to the incident for purposes of augmenting the images with audio description of objects of interest found at the incident scene 500. The device 510 in accordance with block 310 of the process 300 analyzes the captured images to detect objects of interest that may be relevant for investigating the incident scene 500. In the example shown in FIG. 5, the device 510 detects a first object "table" 560, a second object "flower pot" 570, and a third object "wall" 580. The device 510 then identifies the audio stream 150 (i.e., recorded 911 call) that is linked to or associated with the incident being investigated by the user 520 in accordance with block 320 of the process 300. In some embodiments, the device 510 analyzes the audio stream 150 for objects and actions applied to the objects. The device 510 then creates a record (e.g., record 400) and stores a list of objects with a corresponding bookmark (i.e., time window) to the audio stream 150. If the actions applied to the objects are detected to be potentially destructive (e.g., when verbs such as "thrown," "smash," "knock", "broken" are detected from the audio stream 140), the device 510 also includes dismembered parts (e.g., table legs, crooked photo frames, broken lamps on walls and shelves, windows indicative of projectiles being thrown at them, broken chairs without legs etc.) of the objects in the list correlated to the audio stream 150. For example, if the phrase "threw the chair at me" was detected in the audio stream 150, the action "threw" and the object "chair" would then include dismembered parts of a chair in the list of items that the device 510 will be scanning for from the images captured corresponding to the incident scene 500.

The device 510 then determines whether the audio stream 150 (i.e., recorded 911 call) contains an audio description corresponding to one or more of the detected objects 560, 570, 580 in accordance with block 330 of the process 300. The device correlates the objects "table" 560, "flower pot" 570, and "wall" 580 against the list of objects (e.g., objects included in the object field 420 of the record 400) detected from the audio stream 150. If a match is found, the device 510 determines that the particular audio stream 150 contains an audio description corresponding to one or more of the detected objects 560, 570, 580 and further generates and plays back a visual or audio prompt corresponding to the audio description for the objects for which the match was found. In the example shown in FIG. 5, the match is found for all the objects "table" 560, "flower pot" 570, and "wall" 580. Accordingly, in accordance with blocks 340 and 350 of the process 300, the device 510 generates and plays back a visual or audio prompt corresponding to the audio description for each of the objects "table" 560, "flower pot" 570, and "wall" 580. In the example shown in FIG. 5, the device 510 further displays an augmented image or images captured corresponding to the incident scene 500 by highlighting each object detected from the incident scene 500 and matched with any of the objects detected from the audio stream 150. In accordance with some embodiments, the objects are automatically highlighted on the displayed images when the objects appear in close proximity (e.g., within a predefined threshold distance from the device 510) and/or within a field-of-view of the camera 530 and/or the user 520. In accordance with some embodiments, when the user 520 selects via the input device 550 (e.g., with an eye-gaze, hand gesture, voice command, touch input etc.) one or more of the highlighted objects displayed on the device 510, the device 510 plays back relevant audio snippets from the audio stream 150 describing the selected objects and the corresponding actions applied to the selected objects. As shown in FIG. 5, the device 510 displays a text label 562 representing the audio description "He kicked the table down" 562 corresponding to the object "table" 560 when the user selects the object "table" 560 displayed on the device 510. The device 510 also displays a text label 572 representing the audio description "and threw the flower pot at me and missed" 562 corresponding to the object "flower pot" 570 when the user selects the object "flower pot" 570 displayed on the device 510. The device 510 similarly displays a text label 582 representing the audio description "but hit the wall behind me" 582 corresponding to the object "wall" 580 when the user selects the object "wall" 580 displayed on the device 510.

In addition, in some embodiments, the device 510 further augments the images captured corresponding to the incident scene 500 by overlaying (e.g., in proximity to a screen space on the display where the object is displayed) an indicator such as a number to indicate which object was used in relation to another. The number may indicate the sequence in which the actions (e.g., as described by the caller in the 911 call record) were applied to different objects during the occurrence of the incident. As shown in FIG. 5, indicators "1" 564, "2" 574, and "3" 584" are overlaid on the image displayed corresponding to the incident scene 500 to respectively identify the sequence of actions in relation to the objects "table" 560, "flower pot" 570, and "wall" 580. The device 510 may provide these indicators "1" 564, "2" 574, "3" 584 when the device 510 detects that the objects "table" 560, "flower pot" 570, and "wall" 58 appear in close proximity (e.g., within a predefined proximity distance from the device 510) and/or within a field-of-view of the camera 530 and/or the user 520.

While embodiments of the present disclosure are described with examples relating to augmenting images of public-safety related incident scenes with object descriptions retrieved from public-safety related audio streams, embodiments of the present disclosure can be also readily adapted for non-public safety use cases such as manufacturing and retail environments where there may be a need to investigate and obtain information about particular actions/events that occurred relative to real-world objects based on a recording of an audio call or conversations describing such actions/events.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of augmenting an image of an incident scene with object description, the method comprising:
    detecting, at an electronic computing device, an object of interest in an image captured corresponding to an incident scene;
    identifying, at the electronic computing device, at least one audio stream linked to an incident identifier of an incident that occurred at the incident scene;
    converting, at the electronic computing device, the at least one audio stream to a digital text string;
    semantically, at the electronic computing device, processing the digital text string to identify key terms in the digital text string each representing one of a plurality of objects;
    storing, at the electronic computing device, the key terms representing the objects;
    determining, at the electronic computing device, whether the at least one audio stream contains an audio description of the detected object of interest by comparing a key term identifying the detected object of interest with the stored key terms;
    determining, at the electronic computing device, that the at least one audio stream contains the audio description of the detected object of interest when the key term matches with one of the stored key terms; and
    in response to determining that the audio stream contains the audio description of the detected object of interest, generating, at the electronic computing device, a visual or audio prompt corresponding to the audio description of the detected object of interest and playing back the visual or audio prompt via a corresponding display or audio-output component communicatively coupled to the electronic computing device.

2. The method of claim 1, wherein the at least one audio stream linked to the incident identifier corresponds to an audio recording of an emergency call answered at a public safety answering point to report the incident associated with the incident identifier.

3. The method of claim 1, wherein the at least one audio stream corresponds to an audio or video recording of an interview conducted in relation to the incident associated with the incident identifier.

4. The method of claim 1, further comprising:
identifying, for each of the key terms, at least one time window from the audio stream during which the key term occur within the audio stream; and
storing the identified at least one time window for each of the key terms.

5. The method of claim 4, generating the visual or audio prompt comprises:
selecting the at least one time window identified for the one of the stored key terms; and
retrieving a portion of the audio stream corresponding to the selected at least one time window,
wherein the audio description of the object of interest includes the retrieved portion of the audio stream.

6. The method of claim 1, wherein the display or audio-output component is implemented on an augmented reality glass, the method further comprising:
capturing the image corresponding to the incident scene via a camera communicatively coupled to the augmented reality glass; and
displaying the detected object of interest via the augmented reality glass.

7. The method of claim 6, wherein playing back the visual or audio prompt comprises playing back the visual or audio prompt in response to receiving a user input at the augmented reality glass selecting the detected object of interest.

8. The method of claim 6, wherein playing back the visual or audio prompt comprises playing back the visual or audio prompt in response to determining that the object of interest is detected within a field-of-view of the augmented reality glass.

9. A method of augmenting an image of an incident scene with object description, the method comprising:
detecting, at an electronic computing device, an object of interest in an image captured corresponding to an incident scene;
identifying, at the electronic computing device, at least one audio stream linked to an incident identifier of an incident that occurred at the incident scene;
converting the at least one audio stream to a digital text string;
semantically processing the digital text string to identify first key terms in the digital text string each representing one of a plurality of objects;
semantically processing the digital text string to identify second key terms each representing a respective action applied to one of the objects represented by the first key terms;
assigning, based on the first or second key terms, an indicator to each of the objects, the indicator identifying an order in which the respective action was applied to one of the objects relative to the other of the objects;
identifying, for each of the first and second key terms, at least one time window from the audio stream during which the first and second key terms respectively occur within the audio stream;
storing the first key terms, second key terms, assigned indicator, and the identified at least one time window;
determining, at the electronic computing device, whether the at least one audio stream contains an audio description of the detected object of interest; and
in response to determining that the audio stream contains the audio description of the detected object of interest, generating, at the electronic computing device, a visual or audio prompt corresponding to the audio description of the detected object of interest and playing back the visual or audio prompt via a corresponding display or audio-output component communicatively coupled to the electronic computing device.

10. The method of claim 9, wherein determining whether the at least one audio stream contains the description of the detected object of interest, comprises:
comparing a key term identifying the object of interest with the stored first key terms; and
determining that the at least one audio stream contains the description of the detected object of interest when the key term matches with one of the stored first key terms.

11. The method of claim 10, generating the visual or audio prompt comprises:
selecting a first time window from the at least time window identified for the one of the stored first key terms and retrieving a first portion of the audio stream corresponding to the selected first time window; and
selecting a second time window from the at least one time window identified for one of the stored second key terms representing the action applied to the one of the objects represented by the one of the stored first key terms and retrieving a second portion of the audio stream corresponding to the selected second time window,
wherein the audio description of the detected object of interest includes the first portion of the audio stream and the second portion of the audio stream, and further wherein the visual or audio prompt indicates the indicator identifying the order in which the respective action was applied to the detected object of interest.

12. An electronic computing device, comprising:
a display or audio-output component; and
an electronic processor communicatively coupled to the display or audio-output component, wherein the electronic processor is configured to:
detect an object of interest in an image captured corresponding to an incident scene;
identify at least one audio stream linked to an incident identifier associated with the incident scene;
convert the at least one audio stream to a digital text string;
semantically process the digital text string to identify key terms in the digital text string each representing one of a plurality of objects;
store the key terms representing the objects;
determine whether the at least one audio stream contains an audio description of the detected object of interest by comparing a key term identifying the detected object of interest with the stored key terms;
determine that the at least one audio stream contains the audio description of the detected object of interest when the key term matches with one of the stored key terms; and
in response to determining that the audio stream contains the audio description of the detected object of interest, generate a visual or audio prompt indicating the audio description of the detected object of interest and playing back the visual or audio prompt via the display or audio-output component.

13. The electronic computing device of claim 12, wherein the at least one audio stream linked to the incident identifier corresponds to an audio recording of an emergency call answered at a public safety answering point to report the incident associated with the incident identifier.

14. The electronic computing device of claim 12, wherein the at least one audio stream corresponds to an audio or video recording of an interview conducted in relation to the incident associated with the incident identifier.

15. The electronic computing device of claim 12, wherein the electronic processor is configured to:
   identify, for each of the key terms, at least one time window from the audio stream during which the key term occur within the audio stream; and
   store the identified at least one time window for each of the key terms.

16. The electronic computing device of claim 15, wherein the electronic processor is configured to:
   select the at least one time window identified for the one of the stored key terms; and
   retrieve a portion of the audio stream corresponding to the selected at least one time window,
   wherein the audio description of the object of interest includes the retrieved portion of the audio stream.

17. The electronic computing device of claim 12, wherein the display component is implemented as an augmented reality glass, wherein the electronic processor is configured to:
   capture the image corresponding to the incident scene via a camera communicatively coupled to the augmented reality glass; and
   display the detected object of interest via the augmented reality glass.

18. The electronic computing device of claim 12, further comprising:
   an input interface configured to receive a user input selecting the detected object of interest, wherein the electronic processor is configured to playback the visual or audio prompt in response to receiving the user input.

\* \* \* \* \*